W. KNAUST.
Self-Closing Cock.
No. 161,341. Patented March 30, 1875.
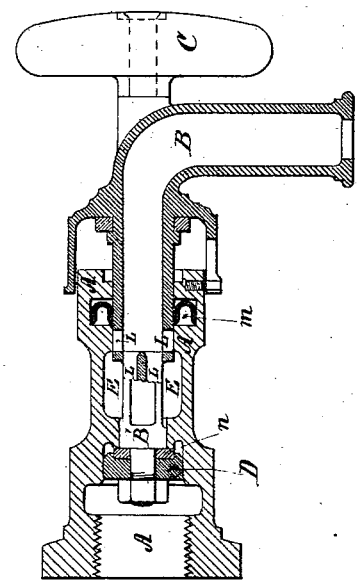
Witnesses.
John F. Allen
Isaac Aaron
Inventor.
Wm Knaust
per Henry E. Roeder
Attorney

UNITED STATES PATENT OFFICE.

WILLIAM KNAUST, OF VIENNA, AUSTRIA.

IMPROVEMENT IN SELF-CLOSING COCKS.

Specification forming part of Letters Patent No. 161,341, dated March 30, 1875; application filed March 1, 1875.

*To all whom it may concern:*

Be it known that I, WILLIAM KNAUST, of Vienna, in the Empire of Austria, have invented a new and Improved Self-Closing Cock or Valve, of which the following is a specification:

The nature of my invention consists in the construction of a faucet in which the valve is closed by the pressure of the water, in such a manner that the closing of said valve takes place gradually and without any shock.

In the accompanying drawing a longitudinal section of a faucet is represented embodying my invention.

A is a metal cylinder, and B is a bent pipe fitted into said cylinder, capable of sliding in the same, and made water-tight by the hydraulic leather packing $m$. To the outer part of this pipe a knob, C, is attached, and to the inner end a disk, D, fitting into a suitable recess in the cylinder A, and provided with a leather washer, $n$, bearing against a suitable surface in the cylinder. The pipe B is provided with openings L, which communicate with a recess or cavity, E, made in the cylinder A, to admit the water to the inner part of the pipe B when the pipe is pushed inward. The inner end B' of the pipe is made solid, forming a piston, working tight in a suitable recess in the cylinder A.

The cylinder being attached in the usual manner, the operation is as follows: By pressing the knob C the bent pipe B is pushed inward, when the valve-disk D is removed from its seat and recess, and the piston part B' of the pipe out of its recess, allowing the water to flow around this piston part B' into the recess E, from whence it enters, through the openings L L, into the pipe B. As soon as the force acting on the knob C ceases to operate, the pressure of the water causes the bent pipe B, by its action upon the valve-disk D, to move outward, and thus closing the valve. This closing, however, does not take place suddenly, but gradually—that is, without any shock—on account of the valve-disk receding by the pressure of the water, retains between itself and its seat a small quantity of water, which partially flows back into the conduct, and partially into the recess E before the piston closes, preventing thereby every shock or jar.

The advantages of this improvement are, first, that the pipe is gradually or slowly closed in an automatic manner; second, all springs and other elastic buffer-disks, which require renewing from time to time, are dispensed with; and, lastly, the construction of this faucet or valve is very simple.

What I claim as my invention, and desire to secure by Letters Patent, is—

A cylinder, A, with recess E, in combination with a bent pipe, B, sliding in said chamber, valve-disk D, openings L L, and knob C, the whole being arranged in the manner and for the purpose substantially as described.

In testimony that I claim the foregoing I have hereunto set my hand this 25th day of January, 1875.

WM. KNAUST.

In presence of—
OTTO WHIVSKE,
C. BACH.